(12) United States Patent
Nonaka et al.

(10) Patent No.: US 8,471,944 B2
(45) Date of Patent: Jun. 25, 2013

(54) CAMERA AND DISPLAY CONTROL METHOD OF THE SAME

(75) Inventors: Osamu Nonaka, Sagamihara (JP); Akira Tani, Sagamihara (JP); Satoshi Hara, Hino (JP)

(73) Assignee: Olympus Imaging Corp., Tokyo (JP)

( * ) Notice: Subject to any disclaimer, the term of this patent is extended or adjusted under 35 U.S.C. 154(b) by 323 days.

(21) Appl. No.: 12/859,937

(22) Filed: Aug. 20, 2010

(65) Prior Publication Data

US 2011/0043651 A1  Feb. 24, 2011

(30) Foreign Application Priority Data

Aug. 21, 2009  (JP) ................... 2009-192192

(51) Int. Cl.
*H04N 5/222* (2006.01)
*H04N 5/228* (2006.01)
*H04N 5/76* (2006.01)
*H04N 5/225* (2006.01)

(52) U.S. Cl.
USPC .............. 348/333.05; 348/222.1; 348/231.99; 348/231.3; 348/220.1; 348/333.01

(58) Field of Classification Search
USPC ................... 348/207.99, 218.1, 220.1, 222.1, 348/231.99–240.3, 239, 333.01–333.13
See application file for complete search history.

(56) References Cited

U.S. PATENT DOCUMENTS

| | | | | |
|---|---|---|---|---|
| 2003/0160874 | A1* | 8/2003 | Kuroiwa | 348/220.1 |
| 2004/0022522 | A1* | 2/2004 | Terada | 386/69 |
| 2004/0109673 | A1* | 6/2004 | Yatabe et al. | 386/69 |
| 2004/0160525 | A1* | 8/2004 | Kingetsu et al. | 348/364 |
| 2004/0202456 | A1* | 10/2004 | Sasagawa | 386/120 |
| 2005/0259163 | A1* | 11/2005 | Tsujii et al. | 348/231.2 |
| 2007/0031141 | A1* | 2/2007 | Tanaka | 396/287 |
| 2007/0201839 | A1* | 8/2007 | Murakami | 386/125 |
| 2007/0258703 | A1* | 11/2007 | Ohnishi | 386/121 |
| 2008/0024645 | A1* | 1/2008 | Mizumori | 348/333.11 |
| 2009/0002478 | A1* | 1/2009 | Ueki | 348/14.01 |
| 2009/0086080 | A1* | 4/2009 | Suehiro et al. | 348/333.01 |
| 2009/0115861 | A1* | 5/2009 | Mochizuki | 348/220.1 |
| 2009/0238419 | A1* | 9/2009 | Steinberg et al. | 382/118 |

FOREIGN PATENT DOCUMENTS

| | | |
|---|---|---|
| CN | 101047787 | 10/2007 |
| JP | 2007-295529 | 11/2007 |
| JP | 2008-252296 | 10/2008 |

OTHER PUBLICATIONS

Office Action for Chinese Patent Application No. 20101260090.X, mailed Mar. 15, 2013 (4 pgs.).

\* cited by examiner

*Primary Examiner* — Michael Osinski
(74) *Attorney, Agent, or Firm* — John C. Pokotylo; Straub & Pokotylo

(57) ABSTRACT

A camera according to the present invention comprises: an imaging section converting an object image into image data; a storage section storing still image data of a still image obtained by the imaging section, thumbnail image data of the still image, and moving image data of a moving image which has been photographed at timing at least either before or after photographing of the still image; a display section performing display of one or more thumbnail views according to the thumbnail image data; and a display control section, when one of the thumbnail views is designated in the thumbnail view display, performing display of the still image on the display section according to the still image data corresponding to the designated thumbnail view after having performed display of the moving image according to the moving image data corresponding to the designated thumbnail view stored in the storage section.

11 Claims, 12 Drawing Sheets

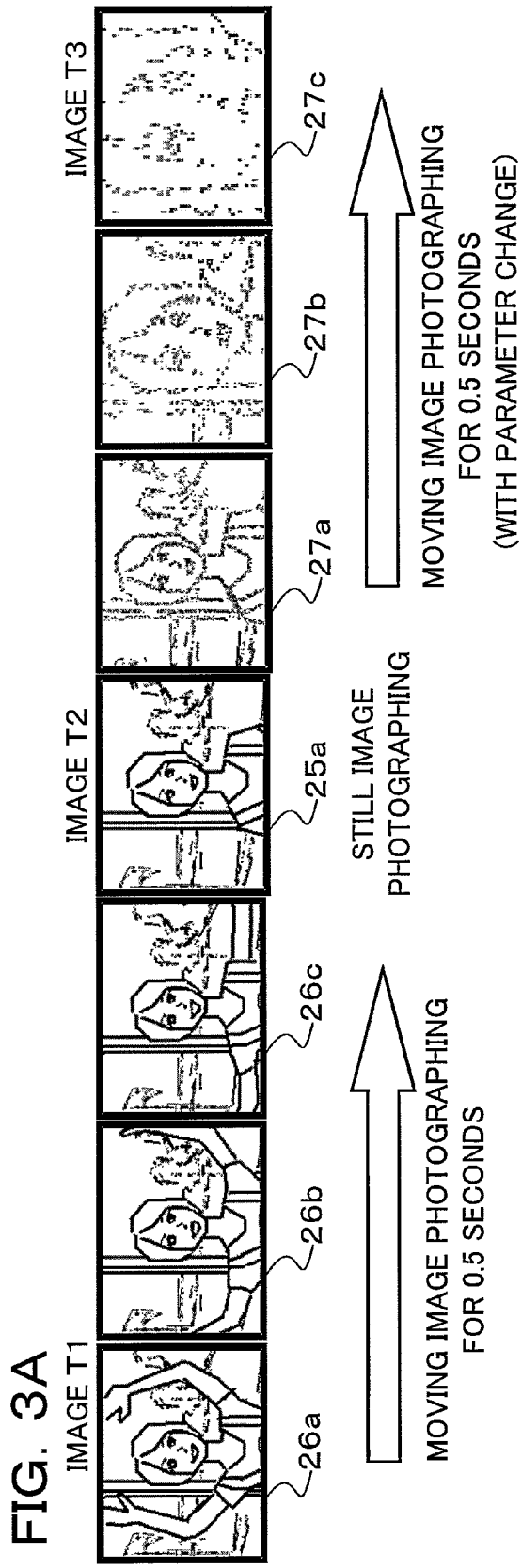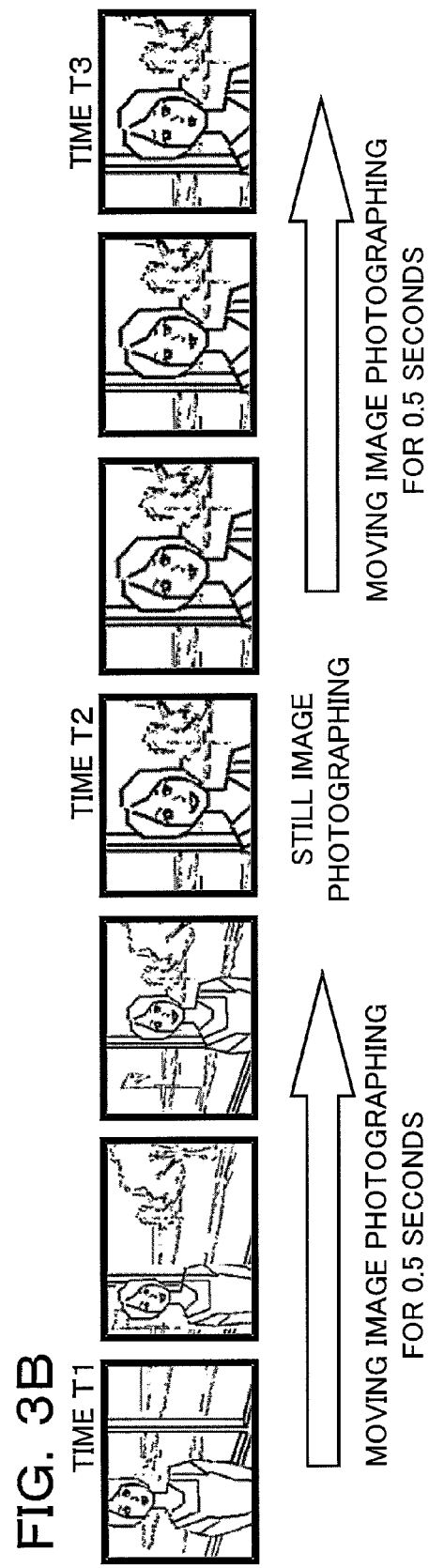

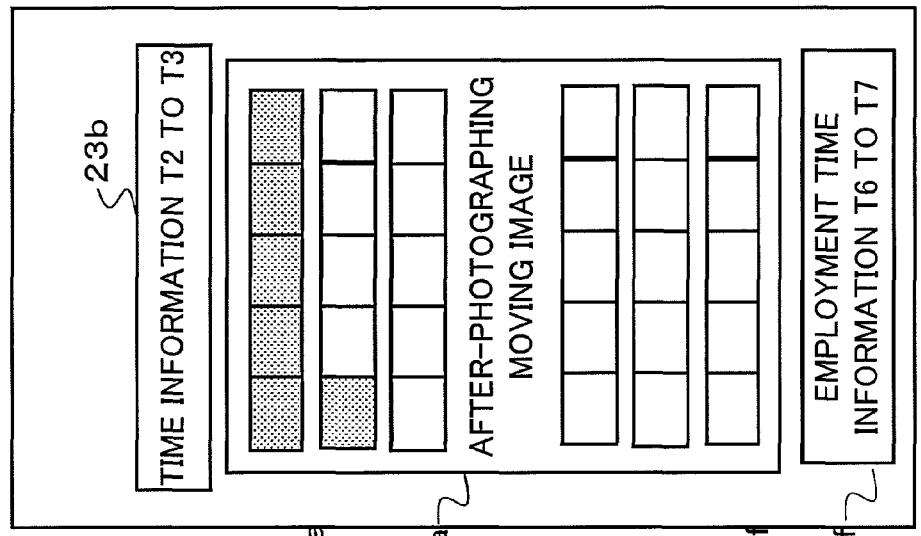
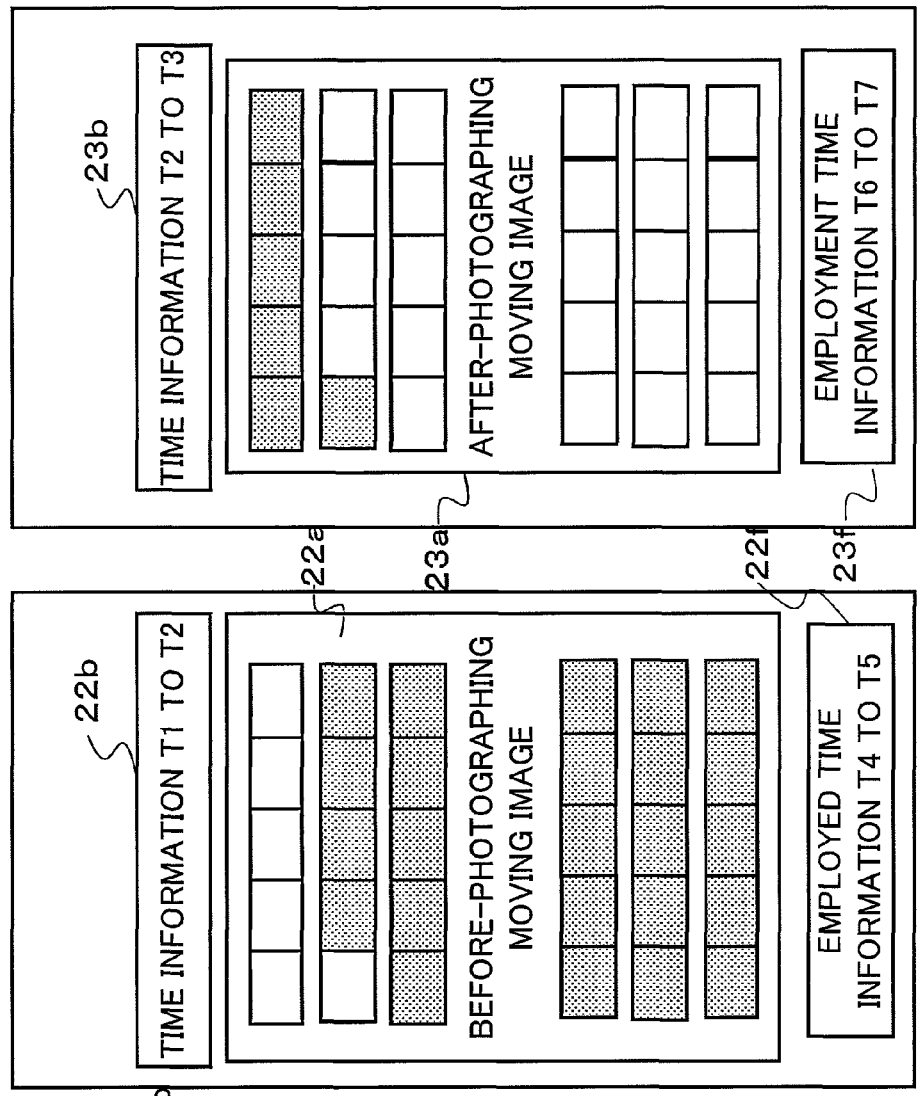
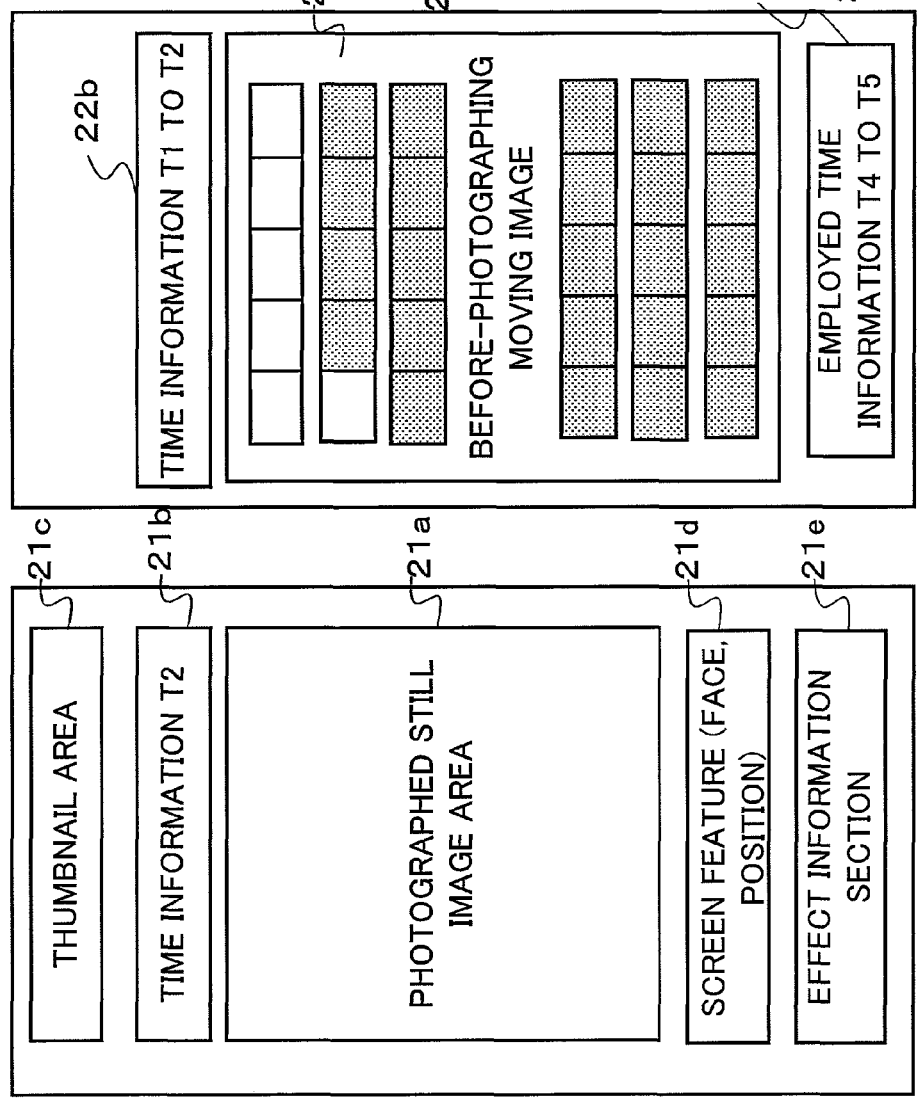

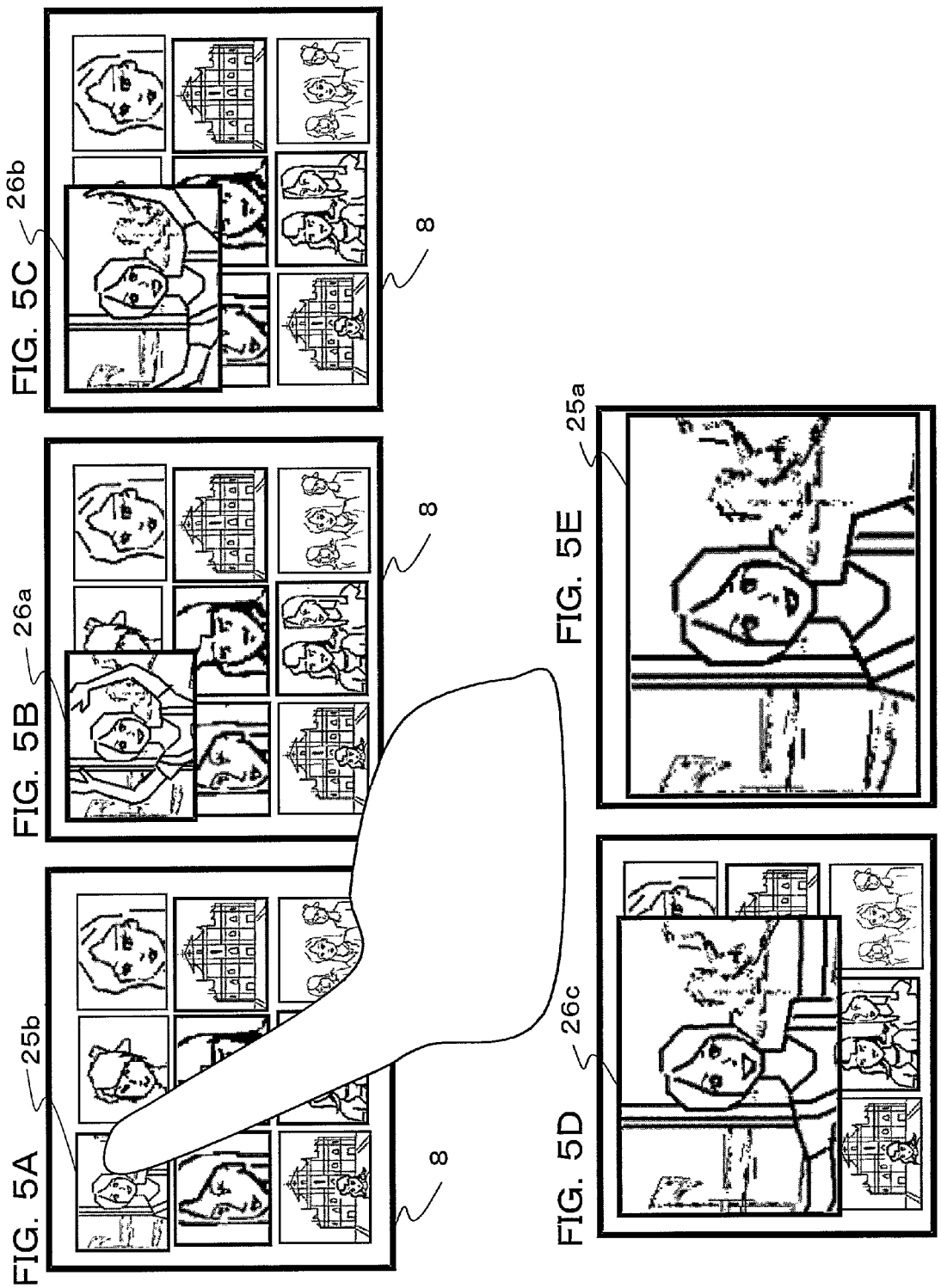

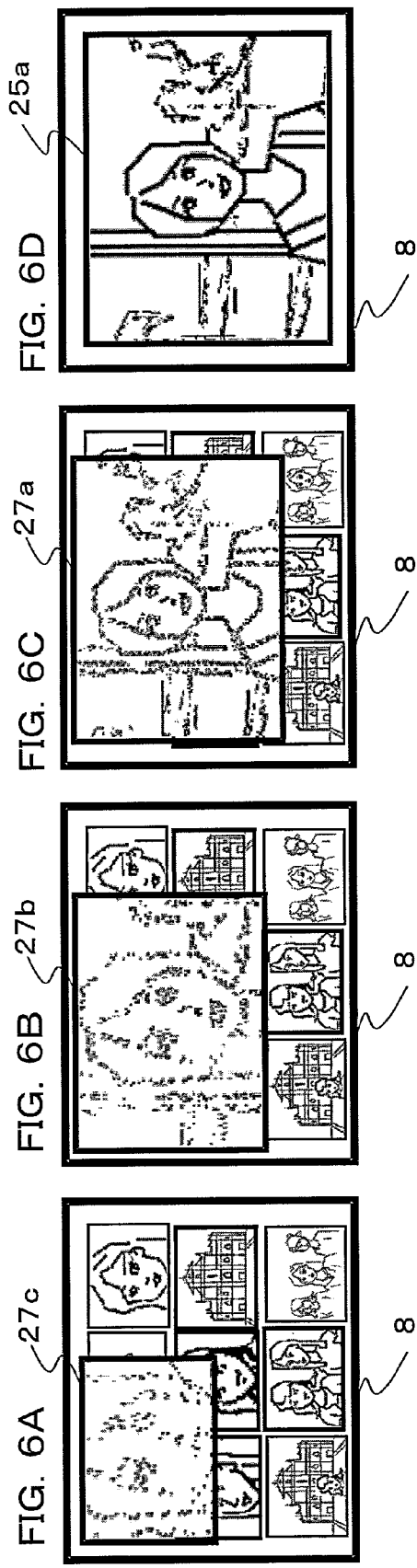

CAMERA AND DISPLAY CONTROL METHOD OF THE SAME

Benefit is claimed, under 35 U.S.C. §119, to the filing date of prior Japanese Patent Application No. 2009-192192 filed on Aug. 21, 2009. This application is expressly incorporated herein by reference. The scope of the present invention is not limited to any requirements of the specific embodiments described in the application.

BACKGROUND OF THE INVENTION

1. Field of the Invention

The present invention relates to cameras and camera display control methods, and, in detail, relates to a camera having a function of still image photographing and moving image photographing such as a digital camera, a video camera, and a mobile phone with a camera, and relates to a display control method of the camera.

2. Description of the Related Art

Still image photographing as cutting out a moment as in the conventional film photograph is comparatively easy for a typical user. On the other hand, in moving image photographing, it is difficult how to fix start timing and end timing and a movie camera is used frequently in a formalized case such as an athletic festival and a wedding ceremony.

Further, except when detailed rendering is preliminarily determined, a photographed moving image has little variety and it is very difficult to make it an image worth viewing. This is because it is difficult to endure the monotonous image for a user accustomed to viewing a moving image in which composition changes frequently as in a TV program. Moreover, although a colorful expression can be obtained by the change of photographing parameters, it is difficult for an amateur user to do it.

In this manner, although the moving image photographing is difficult for the typical user, the still image has a limitation for obtaining the colorful expression on the other hand. Accordingly, there is an idea of performing display by combining the moving image and the still image. For example, Japanese Patent Application laid-Open Publication No. 2008-252296 (published on Oct. 16, 2008) discloses a face index generation apparatus which is capable of displaying a period when the same person appears continuously correspondingly to the face image of each character.

SUMMARY OF THE INVENTION

The present invention aims for providing a camera which is suitable for a photographer to enjoy a moving image together when viewing an image such as an intentionally photographed still image, and for providing a display control method of the camera.

A camera according to the present invention comprises: an imaging section converting an object image into image data and outputting the image data; a storage section storing still image data of a still image obtained by the imaging section, thumbnail image data of the still image, and moving image data of a moving image which has been photographed at timing at least either before or after photographing of the still image; a display section performing display of one or more thumbnail views according to the thumbnail image data stored in the storage section; and a display control section, when one of the thumbnail views is designated in the thumbnail view display, performing display of the still image on the display section according to the still image data corresponding to the designated thumbnail view after having performed display of the moving image according to the moving image data corresponding to the designated thumbnail view stored in the storage section.

Further, a display control method of a camera according to the present invention comprises the steps of: obtaining image data from an object image; storing still image data obtained for a still image and moving image data of a moving image photographed at timing at least either before or after photographing of the still image; and performing display of a thumbnail view on a display section according to the still image data; and performing display of the still image on the display section, when one of the thumbnail views is designated on a display screen of the thumbnail views, according to the still image data corresponding to the designated thumbnail view after having performed the display of the moving image according to the moving image data corresponding to the designated thumbnail view.

BRIEF DESCRIPTION OF THE DRAWINGS

FIGS. 3A and 3B are diagrams showing a state of photographing a moving image together before and after the photographing of a still image in a camera according to an embodiment of the present invention.

FIGS. 4A to 4C are diagrams showing recorded information of a still image and moving images photographed before and after the still image in a camera according to an embodiment of the present invention.

FIGS. 5A to 5E are diagrams showing a state of displaying a moving image photographed together in the photographing of a still image when the still image is enlarged from a thumbnail view and displayed, in a camera according to an embodiment of the present invention.

FIGS. 6A to 6D are diagrams showing another example for a state of displaying a moving image photographed together in the photographing of a still image when the still image is enlarged from a thumbnail view and displayed, in a camera according to an embodiment of the present invention.

DETAILED DESCRIPTION OF THE PREFERRED EMBODIMENTS

Figure 1:
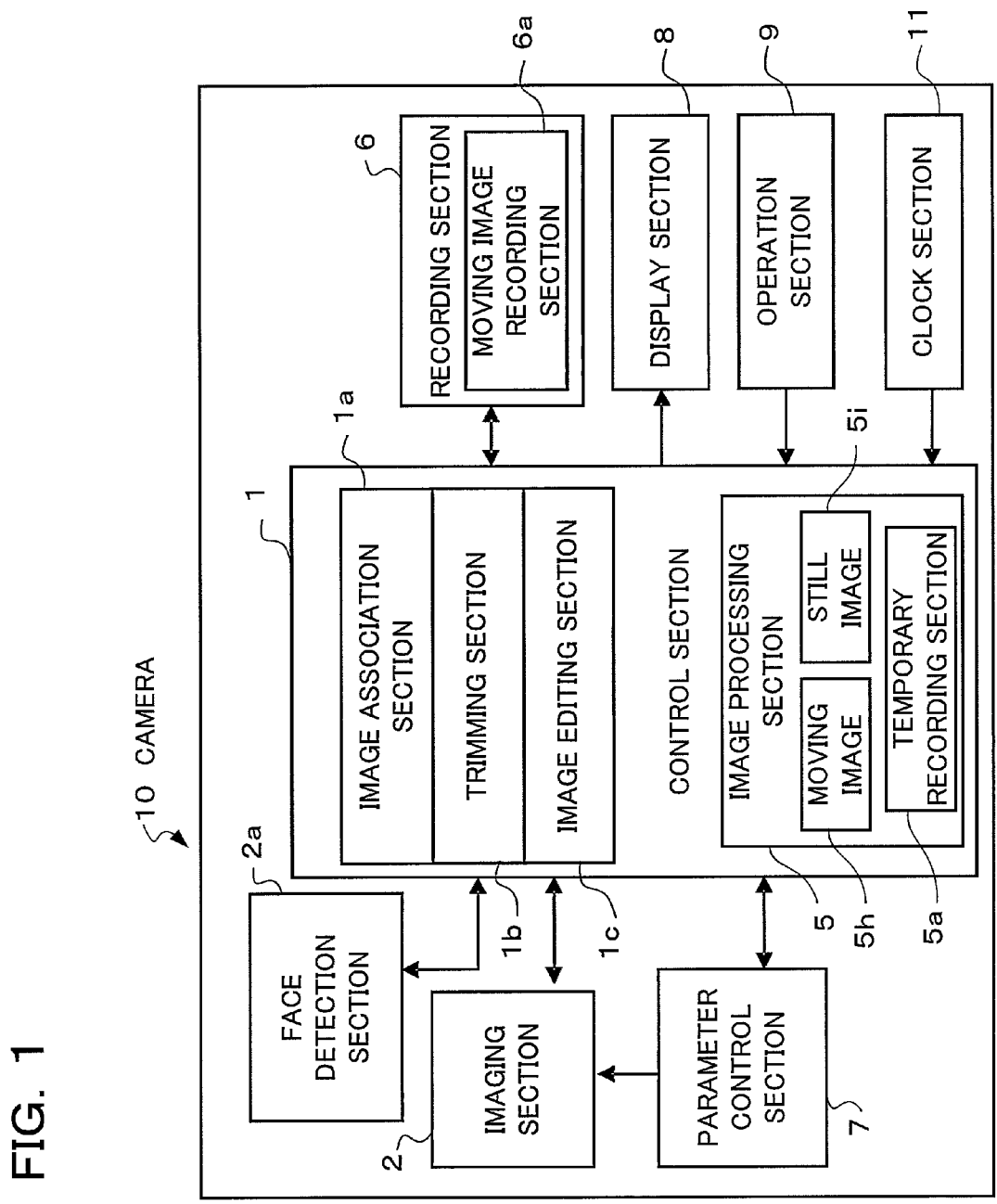
FIG. 1 is a block diagram showing an electrical configuration of a camera according to an embodiment of the present invention.

Hereinafter, preferred embodiments will be explained using a camera to which the present invention is applied, according to the drawings. FIG. 1 is a block diagram showing an electrical circuit of a camera 10 according to an embodiment of the present invention. The camera 10 is a digital camera and configured with a control section 1, an imaging section 2, a face detection section 2a, a recording section 6, a parameter control section 7, a display section 8, an operation section 9, a clock section 11, and the like.

The imaging section 2 includes a photographing lens (zoom lens) having a zoom function, an exposure control section such as a shutter and an aperture, an imaging element, a driving and reading-out circuit of the imaging element, and the like, and converts an object image formed by the photographing lens into image data with the imaging element and outputs this image data. Further, the photographing lens of the imaging section 2 includes a focusing lens and a mechanism thereof, and it is possible to perform photographing while shifting focus in the photographing of a moving image for transition. Moreover, an aperture adjusting mechanism is provided for blurring the background.

The face detection section 2a detects whether the face of a person is included or not in the object image and detects the position, size, and the like thereof when the face is included, using the image data processed by the control section 1, and then outputs the detection result to the control section 1. Note that the face detection is performed by the extraction of a shade and shadow in a face part such as an eye, a nose, and a mouth using a pattern matching method or the like. Further, when the face part is specified, an expression may be determined by the use of the change thereof.

The parameter control section 7 performs the control of the imaging section 2 according to a photographing parameter manually set or automatically set in the parameter setting section which is not shown in the drawing. By the control of the photographing parameter, it becomes possible to adjust a field angle and background blurring (depth of field). By changing these characteristics, it is possible to provide various effects and to enjoy the photographing. Further, the parameter control section 7 detects currently set values of an aperture value, a focusing distance, and the like and outputs these values to the control section 1.

The control section 1 controls the whole sequence of the camera 10 according to a program stored in a storage section which is not shown in the drawing. The control section 1 includes an image association section 1a, a trimming section 1b, an image editing section 1c, and an image processing section 5. The image association section 1a associates moving images photographed before or after the photographing of a still image with one another. This association will be described hereinafter by the use of FIG. 4 and the associated image data is recorded in the recording section 6.

The trimming section 1b performs trimming processing for cutting out a part of the image data output from the imaging section 2. In the cutting-out of the image data, an image in a center part of a screen is cut out and alternatively the periphery of an object face is cut out according to the face position or the face size detected by the face detection section 2a, and then the image provided with the trimming is displayed in the display section 8 and recorded in the recording section 6.

The image editing section 1c edits the moving images before and after the still image photographing. That is, as described hereinafter, the present embodiment reproduces and displays the image data of the moving image while reading out the image data of the still image when one still image has been selected from thumbnails images. In this moving image reproduction, the moving image is not simply reproduced and displayed, but reproduced while an image frame is gradually enlarged. The image editing section 1c generates the image for this reproduction and display.

The image processing section 5 includes a temporary recording section 5a, a moving image processing section 5h, and a still image processing section 5i, and takes in the image data output from the imaging section 2, and the image processing section 5 performs various kinds of image processing such as thinning processing, resizing processing, cut-out processing, edge enhancement processing, color correction, and image compression, and provides the image processing for reproducing and displaying the moving image, for recording a still image and a moving image in the recording section 6, for reproducing and displaying the still image and the moving image, and for the other purposes. In the image compression/decompression and the like, the image processing section 5 includes circuits for a still image and a moving image depending on the respective types of processing, such as a still image compression/decompression circuit, a moving image compression/decompression circuit, and the like.

The temporary recording section 5a is a memory for temporarily recording the image data of a moving image photographed successively after the still image photographing, as described hereinafter. Details of the image processing section 5 will be described hereinafter by the use of FIG. 2.

The recording section 6 records the still image or the image data which has been obtained by the imaging section 2 when a photographing instruction is provided by a release button and has been provided with the compression processing by the image processing section 5. A moving image recording section 6a within the recording section 6 performs final recording of the image data of the moving images before and after the still image photographing performed by the instruction from the release button, in the image data of the moving images temporarily recorded in the temporary recording section 5a.

The operation section 9 includes various operation members such as a release button, a power switch, a reproduction mode setting button, and a menu button, and determines the operation states of these operation members and sends the determination result to the control section 1. The above control section 1 performs the control of photographing or reproduction in a predetermined sequence according to the operation state of the operation member.

The display section 8 has a display part such as a liquid crystal panel or an organic EL panel disposed on the rear side of the camera 10, performs live-view display before photographing, normal reproduction display of the recorded image, camera information display, and the like. A photographer can determine composition and timing while observing the live-view display. Further, the display section 8 also performs the reproduction and display of the moving images photographed before and after the still image photographing during the image read-out of the still image when the still image selected from the thumbnail views is enlarged and displayed.

The clock section 11 performs clock operation and outputs photographing date and time information. This photographing date and time information is recorded together with the image data of the still image and the moving image when recorded in the recording section 6. Further, the clock section 11 is used also in the temporary recording for a predetermined time when the moving image is photographed before and after the still image photographing.

Figure 2:
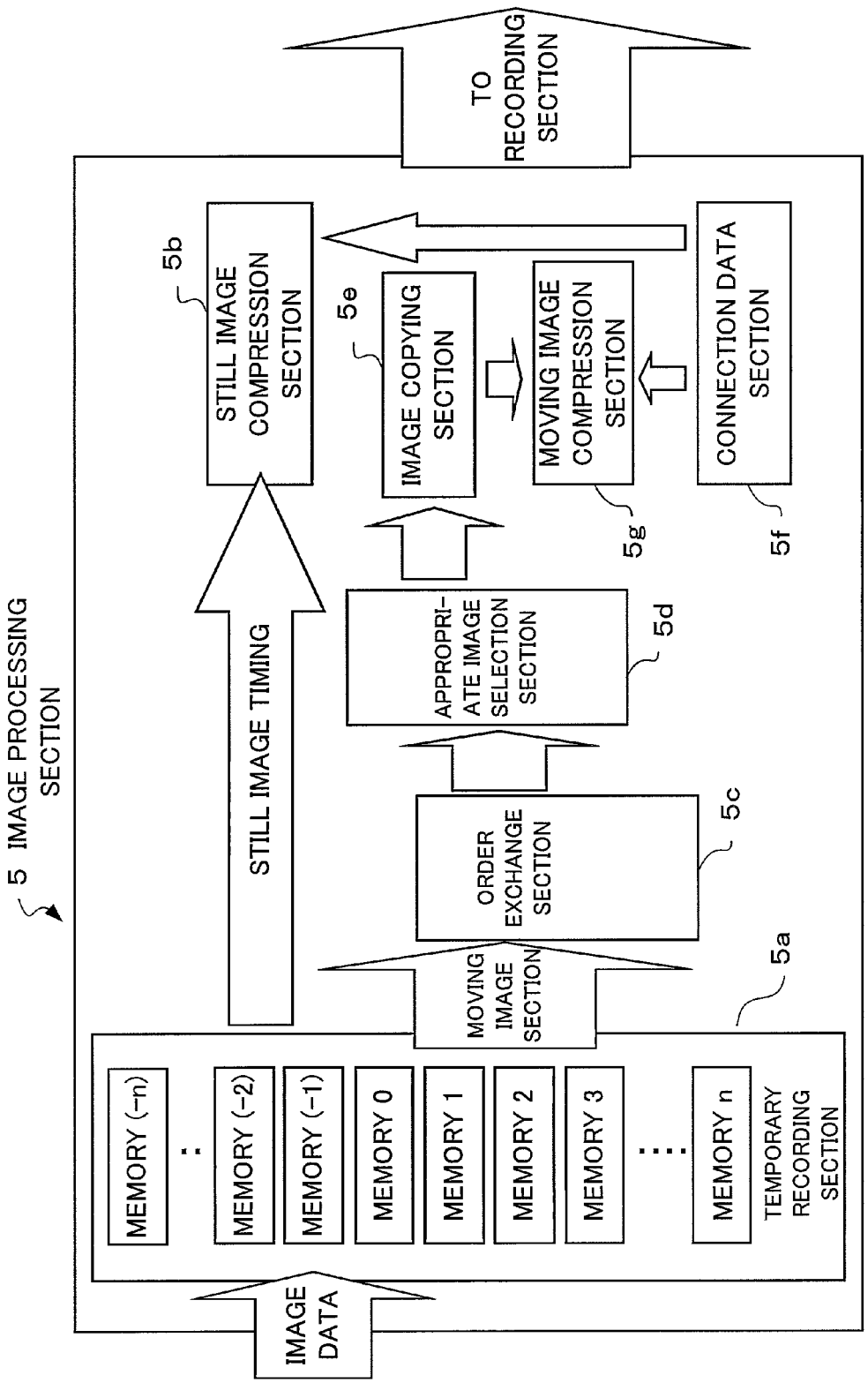
FIG. 2 is a block diagram showing details of an image processing section in a camera according to an embodiment of the present invention.

Next, a detailed configuration of the image processing section 5 will be explained by the use of FIG. 2.

The image processing section 5 takes in the image data output from the imaging section 2 and performs the various kinds of image processing such as the thinning processing and the cutting-out processing as described above, and, here, there will be mainly explained a configuration related to the temporary recording for the image data of the moving images photographed before and after the still image photographing.

The temporary recording section 5a is a memory for temporarily storing the image data from the imaging section 2, and has a memory (−n) to a memory (−1), a memory (0), and a memory 1 to a memory n. Here, the memory (−n) to the memory (−1) are memories for temporarily storing the moving image photographed for the predetermined time preceding the still image photographing, the memory 0 is a memory for temporarily storing the image data of the still image, and the memory 1 to the memory n are memories for temporarily storing moving image photographed for the predetermined time succeeding the still image photographing. Note that all of the memory (−n) to the memory n need not always record the image data and only limited memories among them may be used for recording the image data of the still image and the moving image.

The memory 1 to the memory n storing the image data of respective frames in the moving image (continuous photographing image) are connected to an order change switch (SW) 5c. This order change switch 5c changes the image data order of the respective frames temporarily recorded in the memory 1 to the memory n, as needed. That is, after the moving image has been recorded, the last image data temporarily recorded in the memory n is first read out, and successively the image data is read out in the order of the memory n−1, memory n−2, . . . , memory 2, memory 1. Thereby, the image is reproduced as if time is reversed.

The order change switch 5c is connected to an appropriate image selection section 5d. This appropriate image selection section 5d selects the image data of an image suitable for the moving image (continuous photographing image), for example, except an image having an abrupt composition change or blurring, from the image data temporarily stored in the memory 1 to the memory n.

The appropriate image selection section 5d is connected to an image copying section 5e. The image copying section 5e copies the moving image while interpolating or thinning the image data for each frame of the moving image in order to temporally expand or compress the image. As described hereinafter, after the termination of the photographing, the moving image which has been photographed for 0.5 seconds is reproduced and displayed after having been expanded for 2 seconds, for example, until the still image is enlarged and displayed. Note that, while the photographing time is assumed to be 0.5 seconds and this is assumed to be expanded for 2 seconds here, the time is not 0.5 seconds but becomes 1 second or 0.3 seconds when only an appropriate part is cut out from the image photographed in a long time. Further, depending on a case, the image is sometimes temporally compressed in the reproduction.

The image copying section 5e is connected to a moving image compression section 5g. The moving image compression section 5g performs moving image compression for the image data expanded for 2 seconds, for example, by the image copying section 5e, using MPEG4, Motion JPEG, or the like. A connection data section 5f generates connection information for combining image data of moving image generated by the moving image compression section 5g and image data of the still image generated by a still image compression section 5b and reproducing both of the data sets continuously. The connection information from the connection data section 5g, the image data from the still image compression section 5b, and the image data from the moving image compression section 5g are sent to the recording section 6 and recorded as a single image file.

Next, the moving image photographing performed before and after the still image photographing will be explained by the use of FIG. 3A. The moving image photographing in the present embodiment is not required to provide a complete level of product quality, since the photographing is performed so as not to put stress on the photographer and performed supplementarily. A product is absolutely the still image. In such an assumption, the present embodiment is configured to automatically perform the moving image photographing before and after the still image photographing without being perceived by the photographer.

FIG. 3 shows images photographed in the order of a moving image 26a, a still image 25a, and a moving image 27c. The still image 25a shows a still image photographed at time T2 in a still image mode, the moving image 26a to a moving image 26c show a moving image photographed between time T1 and time T2 before the still image photographing, and the moving image 27a to a moving image 27c show a moving image photographed between time T2 and time T3 after the still image photographing.

In this example, each of the moving images is photographed for 0.5 seconds before or after the still image photographing and normal moving image photographing is performed without a special processing before the still image photographing.

Further, the images 27a to 27c in the moving image photographed after the still image photographing are provided with exposure correction processing. For this exposure correction processing, the parameter control section 7 changes the focusing distance and the aperture value or the image editing section 1c performs image processing to provide a parameter change for zooming-up and fading-out. The image processing to provide the parameter change, not limited to this example, may include processing such as color balance processing, edge enhancement, color enhancement, black-and-white conversion, and further application of blurring effect by contrast reduction processing and application of exposure correction, for example. By performing the image processing providing the parameter change in the exposure correction, the trimming, or the like, it is possible to obtain a moving image with variety.

Note that, while the present embodiment performs the moving image photographing for 0.5 seconds each before and after the still image photographing, this moving image photographing may be performed either before or after the still image photographing, and the photographing time may be longer or shorter than 0.5 seconds and preferably the time is determined so as not to burden the photographer. Further, even when the moving image photographing is performed before and after the still image photographing, the photographing time may be not the same but may be different for both cases.

Further, while the present embodiment performs the normal image photographing before the still image photographing and performs the parameter change such as the parameter change for the exposure correction after the still image photographing, the moving image photographing may be performed without the parameter change after the still image photographing, the parameter change may be performed before the still image photographing, and the parameter change may be performed in the moving image photographing both before and after the still image photographing. FIG. 3B shows an example of not performing the parameter change either before or after the still image photographing. In this example, expression of a person changes after the still image photographing and an interesting moving image is obtained even without the parameter change.

Next, the recording data of a still image and moving images photographed before and after the still image will be explained by the use of FIGS. 4A to 4C. FIG. 4A shows data related to a still image 25a photographed at time T2. That is, the image data of the still image 25a is recorded in a photographed still image area 21a, information about the time T2 when the still image 25a is photographed is recorded in time information 21b, and image data for displaying the still image 25a in a thumbnail view is recorded in a thumbnail area 21c. That is, by preliminarily generating the image data resized for the thumbnail view, it is possible to quickly read out and display the image data in displaying the thumbnail view. Further, a screen feature section 21d stores a screen feature for selecting an appropriate moving image and an effect information section 21e stores information for reproducing the moving image effectively in the moving image reproduction.

FIG. 4B shows data related to a moving image 26a to 26c photographed between time T1 and time T2. That is, the image data of the moving image 26a to 26c photographed before the still image photographing is stored in a before-photographing moving image area 22a, and information related to time T1 to T2 when the moving image 26a to 26c is photographed is stored in time information 22b. Further, employed time information 23f stores the time of a moving image used for the moving image display in the moving image stored in the before-photographing moving image area 22a. When not all the moving images are used in the displaying of the still image enlarged from the thumbnail view, the time information for a part of the moving image to be displayed is stored in the employed time information 23f. In an example of FIG. 4, the employed moving image is expressed by shading.

FIG. 4C shows data related to a moving image 27a to 27c photographed between time T2 and time T3. That is, the image data of the moving image 27a to 27c photographed after the still image photographing is stored in an after-photographing moving image area 23a, and information about the time T2 to T3 when the moving image 27a to 27c is photographed is stored in time information 23b. Further, employed time information 23f stores the time of a moving image used for the moving image display in the moving image stored in the after-photographing moving image area 23a. When not all the moving images are used in returning from the enlarged still image display to the thumbnail view, the time information for a part of the moving image to be displayed is stored in the employed time information 23f. In the example of FIGS. 4B and 4C, the employed moving image is expressed by shading.

Since the time information T2 is recorded together in the image data of the still image 25a, by searching for a moving image terminating at T2 or a moving image starting at T2 according to the time information T2, it is possible to perform the reproduction of the moving image in the display of the still image 25a. Further, it is also possible to reproduce an interesting part as a moving image in the moving image reproduction according to employed time information T4 to T5 or employed time information T6 to T7. Note that the time information 21b, 22b, and 23b are based on the time and date information from the clock section 11 and employed time information T4 to T5 and T6 to T7 may be stored in the recording file of the still image.

Next, the reproduction of the still image 25a photographed as described above and the moving image 26a to 26c obtained before the still image photographing will be explained by the use of FIGS. 5A to 5E. After the termination of the photographing, the thumbnail image is displayed on the display section 8 in the reproduction as shown in FIG. 5A. The image data of the thumbnail image is stored in a thumbnail area 21c of each still image shown in FIG. 4A, and thereby the control section 1 reads out this image data and displays the thumbnail images on the display section in a list.

A user selects an image desired to be enlarged and displayed, if it exists, from the images displayed in the thumbnail view by touching a touch panel or operating a cross button or the like. An example shown in FIG. 5A shows a state of touching the thumbnail image 25b corresponding to the still image 25a. When the thumbnail image 25b is designated, the moving images 26a to 26c obtained before the photographing of the still image 25a are reproduced and displayed sequentially. First, the moving image 26a is reproduced (refer to FIG. 5B), successively the moving image 26b is reproduced (refer to FIG. 5C), and the moving image 26c is reproduced and displayed (refer to FIG. 5D). For the reproduction of these moving images 26a to 26c, the size of the moving image is gradually increased as shown in FIGS. 5B to 5D and the images are displayed overlapping the thumbnail view. Then, lastly the still image 25a is displayed filling the display screen of the display section 8 as shown in FIG. 5E.

Note that while the moving image 26a to 26c is assumed to have three frames for explanation, obviously the number of the frames may be larger than this number. Further, the photographing time and the reproduction time of the moving image 26a to 26c are not necessary the same as each other and the reproduction time may be expanded.

Next, a variation example of the moving image reproduction will be explained by the use of FIGS. 6A to 6D. While an example shown in FIGS. 5A to 5E reproduces the moving image 26a to 26c, which has been recorded before the still image photographing, before the still image 25a is enlarged and displayed, the variation example shown in FIG. 6 is configured to reproduce the moving image 27a to 27c, which has been recorded after the still image photographing, before the still image 25a is enlarged and displayed.

Although omitted from FIGS. 6A to 6D, the thumbnail images are displayed on the display section 8 in this variation example as in FIG. 5A, and the user designates a thumbnail image desired to be enlarged and displayed among them. When the thumbnail image is designated by a touch or the like, first the moving image 27c is reproduced and displayed (refer to FIG. 6A), and successively the moving image 27b and the moving image 27a are reproduced and displayed in this order while being gradually enlarged.

While, in the example shown in FIG. 5A to 5E, the moving images 26a to 26c are reproduced and displayed in the photographing order, in the example shown in FIGS. 6A to 6D, the moving images 27a to 27c are recorded in the recording section 6 in the order reverse to the photographing order. While the moving images 27a to 27c may be exchanged in the reproduction so as to be arranged in the reverse order, the present embodiment changes the order with the order change switch 5c and the image data of the exchanged images is configured to be recorded in the recording section 6. In this manner, by lastly reproducing and displaying the moving image 27a photographed immediately before the enlarged display of the still image 25a, the continuity of the images is configured to be maintained.

When the moving image is photographed before and after the still image photographing, either the moving image before the still image photographing or the moving image after the still image photographing needs to be selected for the reproduction. Basically, the moving image before the still image photographing is to be selected when the still image is enlarged from the thumbnail view and displayed, and the moving image after the still image photographing is to be selected when the state of displaying the enlarged still image returns to the thumbnail view. That is, for showing a state finally photographed in the still image, the moving image before the still image photographing is more natural between the moving images before and after the still mages photographing.

However, when the composition of the moving image before the still image photographing is unstable, the selection of the moving image after the still image provides a better look if the composition of the moving image after the still image photographing is comparatively stable. When the photographing start abruptly, the composition of the moving image sometimes becomes unstable, as shown in FIG. 3B, because of the movement of an object, the movement of a camera, or the like. In such a case, an image in which a face position does not change significantly in the screen is to be selected as the reproduction moving image. Note that, when expression change does not exists and the image is uninteresting, a face part of FIG. 3B may be provided with trimming and a moving image may be generated. The trimming is performed by the trimming section 1b.

The present embodiment continuously performs the photographing of the moving image also after the still image photographing. Thereby, unless the camera 10 is directed to the object for a predetermined time (0.5 seconds in the embodiment) also after the still image photographing, the moving image becomes an undesirable image. Accordingly, the present embodiment is configured to automatically extract a person 31 positioned in the center of the screen and to record the image after the face part of this person 31 has been provided with the trimming in order to avoid placing more stress than necessary on the photographer.

Figure 7:
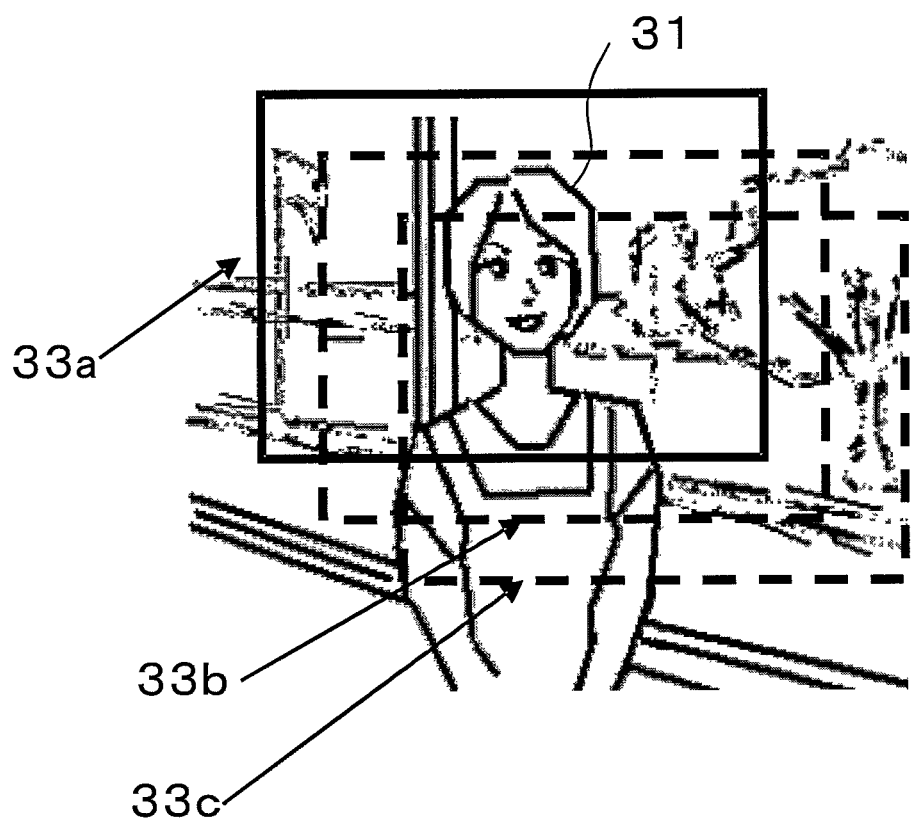
FIG. 7 is a diagram showing a state of changing a camera direction after still image photographing, in a camera according to an embodiment of the present invention.

A method of this trimming will be explained by the use of FIG. 7 and FIGS. 8A to 8F. FIG. 7 shows a state of photographing some object person 31, and a still image is photographed in a photographing area 33a and a moving image is photographed succeeding this still image in photographing areas 33b and 33c. At this time, among the images photographed by the camera 10, FIG. 8A shows an image corresponding to the photographing area 33a, FIG. 8B shows an image corresponding to the photographing area 33b, and FIG. 8C shows an image corresponding to the photographing area 33c.

Figure 8A:
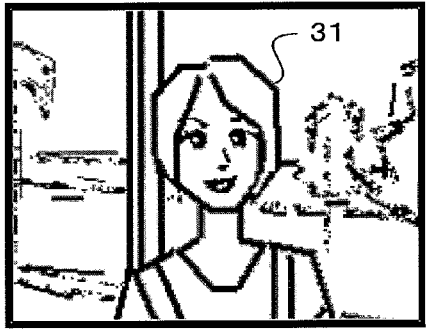
FIGS. 8A to 8F are diagrams showing a state of recording and displaying a center part of a screen as a moving image even when a camera direction is changed after still image photographing, in a camera according to an embodiment of the present invention.
Figure 8D:
Figure 8B:
Figure 8E:
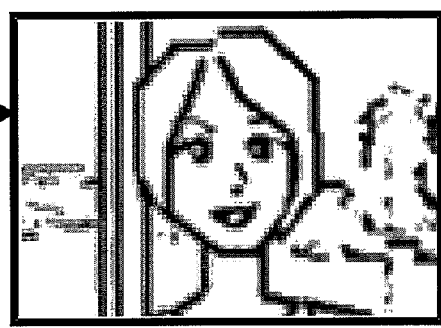
Figure 8C:
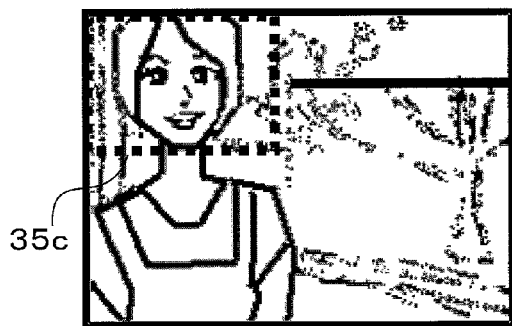
Figure 8F:
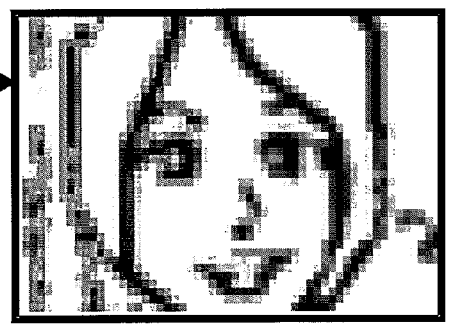

The image of FIG. 8A corresponding to the still image photographing area 33a is recorded as it is as shown in FIG. 8D, but, for the image corresponding to the moving image photographing area 33b, a trimming area 35b including the screen center of the photographing area 33a (person 31 exists in the center) is recorded as shown in FIG. 8E, and, for the image corresponding to the moving image photographing area 33c, a trimming area 35c including the screen center of the photographing area 33a is recorded as shown in FIG. 8F. Here, while the aspect ratios of the trimming areas 35b and 35c may be changed from that of the still image, the same aspect ratio can eliminate uncomfortable feeling, and the present embodiment is configured to employ the same aspect ratio.

In this manner, although the photographer changes the composition to the photographing area from 33a to 33c, the image data of the trimming areas 35b and 35c corresponding to the center part of the still image screen is recorded in the recording section 6. Even when the photographer feels relieved after the still image photographing and changes the composition to the photographing areas 33b and 33c unconsciously, the screen center part is provided with the trimming and recorded. By the use of only the face part by trimming, a moving image expression can be obtained for capturing an expression change of the object. That is, it is possible to record a process in which the object comes to have a relaxed expression, during the transition of the images as shown in FIGS. 8D to 8F, and it is possible to recall a memory.

Note that the trimming processing explained by the use of FIGS. 8A to 8F is carried out by a composition change determination section (not shown in the drawing) and the trimming section 1b within the control section 1. The composition change determination section determines whether the composition of the screen or the posture of the camera 10 has been changed or not, utilizing a motion vector based on the image data output from the imaging section 2. When the composition change determination section determines that the composition has been changed in the photographing areas from 33a to 33c, the trimming section 1b performs the trimming processing according to the determination result. This image data provided with the trimming processing is sent to the above described temporary recoding section 5a and the above described image processing of the moving image is carried out. That is, the image data which is recorded temporarily in each memory in the temporary recording section 5a is provided with the trimming processing by the trimming section 1b and recorded again in the same memory, and then the result is provided with the moving image compression.

Figure 9:
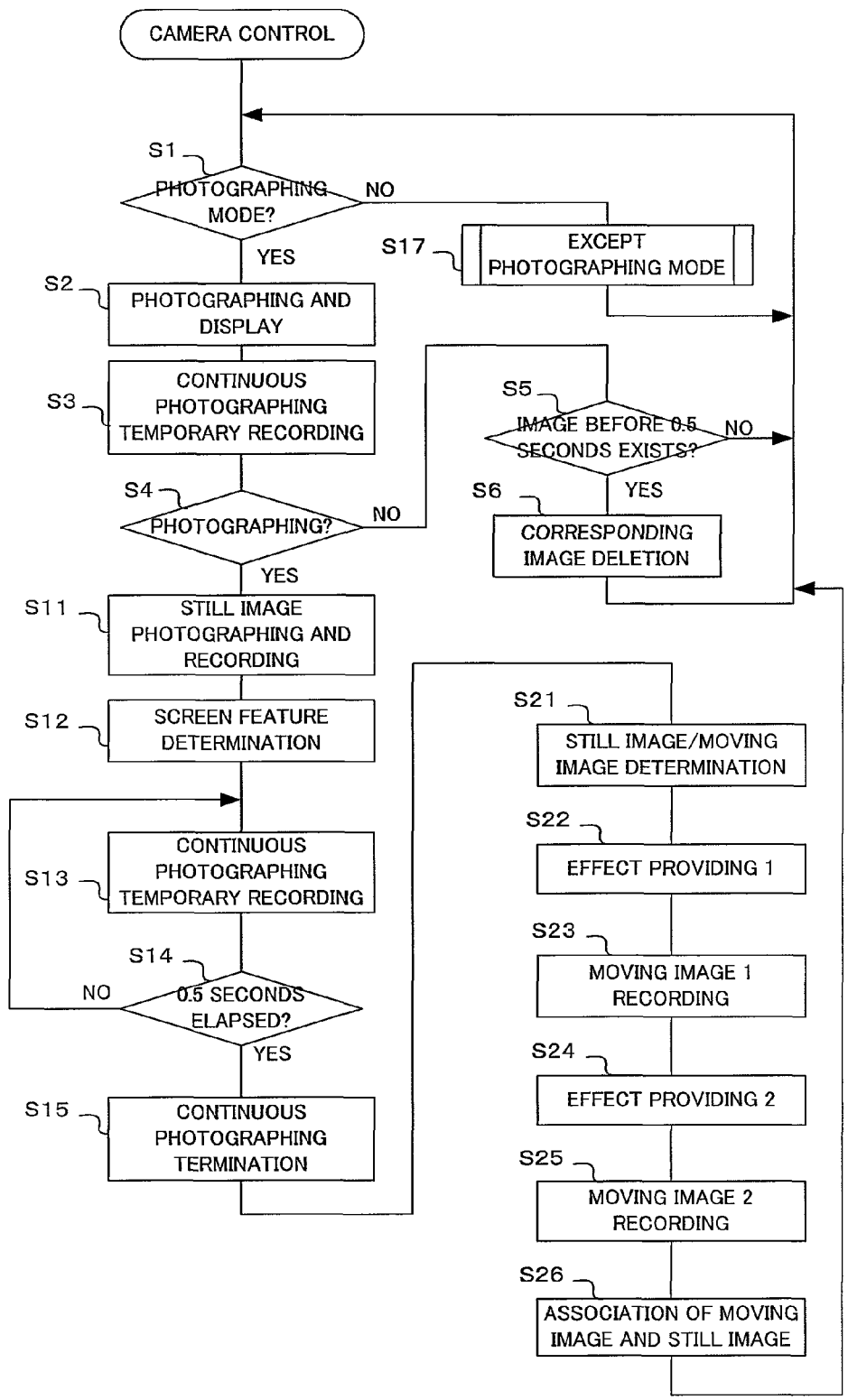
FIG. 9 is a flowchart showing the operation of camera control in a camera according to an embodiment of the present invention.

Next, the operation of the camera control in the present embodiment will be explained by the use of a flowchart shown in FIG. 9. A camera control flow shown in FIG. 9 is executed by a program stored in the control section 1. When the camera is powered on and activated, the flow shown in FIG. 9 starts. At the start, first it is determined whether the photographing mode or not (S1). This camera 10 is provided with the photographing mode and other modes such as the reproduction mode, and a mode selection state by a photographer is determined according to the operation state of the operation section 9.

When the mode is not the photographing mode in the determination result in Step S1, the mode except the photographing mode is carried out (S17). The carrying-out of this mode except the photographing mode will be described hereinafter by the use of FIG. 10. After the mode except the photographing mode has been carried out, the process returns to Step S1.

When the mode is the photographing mode in the determination result in Step S1, photographing and display are performed (S2). In this step, the image data obtained by the imaging section 2 is provided with the image processing in the image processing section 5 and displayed on the display section 8 in a live view. The photographer can decide a composition and a shutter chance while observing the live view display. When the photographing and the display have been performed, subsequently continuous photographing temporary recording is performed (S3). Here, the image data of a moving image obtained by the imaging section 2 is sequentially recorded temporarily in the memory in the temporary recording section 5a.

When the temporary recording of continuous photographing starts, subsequently it is determined whether photographing is to be performed or not (S4). Here, it is determined whether the release button in the operation section 9 has been operated or not. When the photographing is determined not to be performed in this determination result, subsequently it is determined whether an image before 0.5 seconds exists or not (S5), while the photographing and display and the continuous photographing temporary recording are being continued. The present embodiment temporarily records the moving image for a predetermined time, here 0.5 seconds, before the still image photographing and deletes an image before 0.5 seconds if it exists. In this Step S5, when 0.5 seconds have elapsed since the start of the continuous photographing temporary recording, it is determined that the image before 0.5 seconds exists.

When the image before 0.5 seconds exists in the determination result in Step S5, the corresponding image is deleted (S6). Here, the image before 0.5 seconds is deleted from the images temporarily recorded in the memory (−n) to the memory (−1), and recording positions are changed such that a latest image is temporarily stored in the memory (−1). After the deletion of the corresponding image, or when the image before 0.5 seconds does not exist in the determination result in Step S5, the process returns to Step S1.

When the photographing is to be performed in the determination result in Step S4, still image photographing and recording are performed (S11). In this step, the image data output from the imaging section 2 is temporarily recorded in the memory 0 in the temporary recording section 5a of the image processing section 5 and also provided with the image compression in the still image compression section 5b. Then, the image data of the still image after the image compression processing is recorded in the recording section 6.

When the still image photographing and recording has been performed, subsequently screen feature determination is performed (S12). In this screen feature determination, the face detection section 2a determines whether the image includes a face part or not, and detects the position and the size thereof if the face is included. The result of the screen feature obtained here is stored in the screen feature section 21d and utilized in the trimming so as to position the person 31 at the center of the screen as explained by the use of FIG. 7 and FIGS. 8A to 8F. It is optional to determine which part in a moving image is to be used for the reproduction (employed) moving image by utilizing the feature of the still image.

Next, the temporary recording of the continuous photographing is performed (S13). While the temporary recording is performed for the moving image before the photographing in Step S3, here, the image data of the moving image after the photographing is temporarily recorded sequentially in the memory 1 to the memory n in the temporary recording section 5a. When the temporary recording of the continuous recording has been performed, subsequently it is determined whether the predetermined time, here 0.5 seconds, has elapsed or not since the start of the continuous photographing after the photographing (S14). When 0.5 seconds have not elapsed in this determination result, the process returns to Step S13 and the continuous photographing is continued.

When 0.5 seconds have elapsed in the determination result in Step S14, subsequently the continuous photographing is terminated (S15), and still image/moving image determination is performed (S21). This step decides an effect to be provided to each of the moving image before the still image photographing and the moving image after the still image photographing. In the example shown in FIG. 3, the moving image before the photographing is not provided with a particular effect, but the moving image after the photographing is provided with a parameter change to perform the zooming-up and fading-out. Except this example, it is optional also to provide a parameter change suitable for the object utilizing the result of the screen feature determination in Step S12.

Successively, the image editing section 1c or the like performs the image processing of effect providing 1 for the moving image before the photographing determined in the still image/moving image determination (S22), and this image data provided with the image processing is recorded in the recording section 6 (S23). Further, the image editing section 1c or the like performs the image processing of effect providing 2 for the moving image after the photographing determined in the still image/moving image determination (S24), and this image data provided with the image processing is recorded in the recording section 6 (S25).

When the moving image 2 after the still image photographing has been recorded, subsequently a correspondence relationship between the still image and the moving image is recorded (S26). Since generally an image file is frequently configured differently for the still image and the moving image, the connection data section 5f records the correspondence relationship among the moving image before the still image photographing, the still image, and the moving image after the still image photographing. After the record of the correspondence relationship, the process returns to Step S1.

Figure 10:
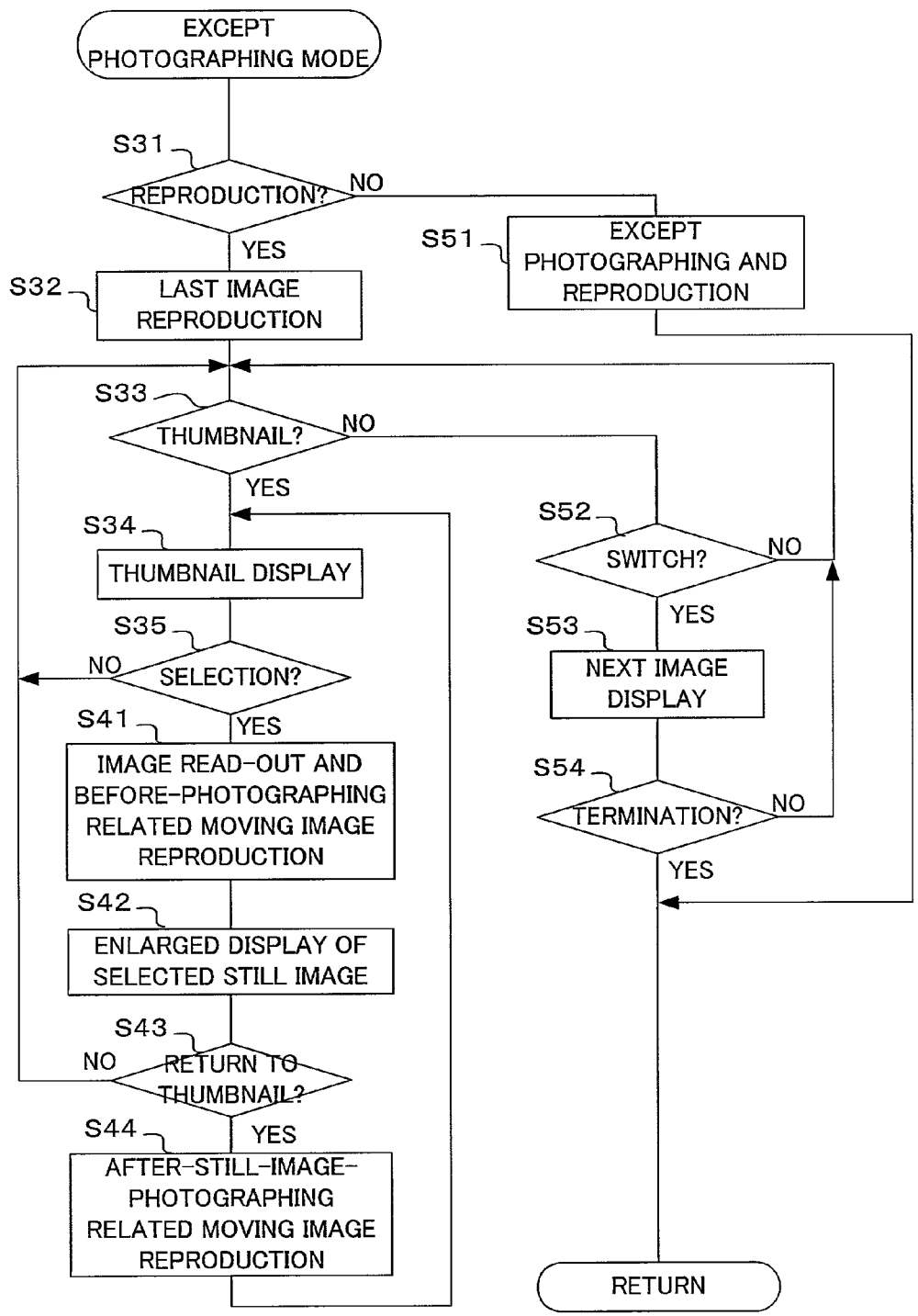
FIG. 10 is a flowchart showing the operation of a subroutine except a photographing mode, in a camera according to an embodiment of the present invention.

Next, the mode except the photographing mode in Step S17 will be explained by the use of a flowchart shown in FIG. 10. When this flow starts, first it is determined whether the reproduction mode or not (S31). It is determined whether the reproduction mode has been selected or not, according to the operation state of the operation section 9. When the reproduction mode has not been selected in this determination result, it is determined whether the mode except the photographing and reproduction modes has been selected or not, and this mode is carried out. When the mode except the photographing and the reproduction modes has been carried out, the process returns to the original flow.

When the reproduction mode has been selected in the determination result in Step S31, subsequently it is determined whether the thumbnail view has been selected or not (S33). When the reproduction mode starts, the still image photographed most lately is displayed in a single frame, and, when a user desires to view many still images displayed in a thumbnail view and select a still image among them, the user operates an operation member for the thumbnail view, and thereby this step determines the operation state of the operation section 9.

When the thumbnail view is selected in the determination result in Step S33, subsequently the thumbnail view display is performed (S34). In this step, the image data of the thumbnail image recorded in the thumbnail area 21c of each still image is read out from the image data of the still image recorded in the recording section 6 and displayed on the display section 8 in a thumbnail view.

When the thumbnail view display has been performed, subsequently it is determined whether one frame has been selected among the plural thumbnail images (S35). As explained in FIG. 5A, when the user desires to view one frame among the plural thumbnail images in an enlarged size, the user selects this frame by the touch of a finger (refer to FIG. 5A). Accordingly, this step determines whether one frame has been selected by the touch or the like.

When one frame has been selected in the determination result in Step S35, subsequently image read-out and the selection of a before-photographing related moving image are performed (S41). Here, as explained by the use of FIGS. 5B to 5D, the image data of the moving image 26a to 26c photographed before the still image 25a photographed is read out from the moving image recording section 6a and the images are reproduced and displayed while being sequentially enlarged.

When the reproduction of the moving image has terminated, subsequently the enlarged display of the selected still image is performed (S42). Here, as shown in FIG. 5E, the image data of a still image corresponding to the selected thumbnail image is enlarged and displayed on the display section 8. The image data of the still image is recorded in the photographed still image area 21*a* in the recording section 6 and the image data is read out from this area for the display.

When the still image has been enlarged and displayed, subsequently it is determined whether the process is to return to the thumbnail view or not (S43). For the return to the thumbnail view, operation such as the touch on the screen of the display section 8 is performed again, and thereby it is determined in this step whether the screen has been touched or not. Note that the determination whether the process is to return to the thumbnail view may be performed by another method such as a slide of the touch panel and movement of a zoom switch to the wide side. When the process is not to return to the thumbnail view, or when one frame has not been selected in the determination result in Step S35, the process returns to Step S33.

When the process is to return to the thumbnail view in the determination result in Step S43, the reproduction of the related image after still image photographing is performed (S44). In this step, while the thumbnail view display in Step S34 is performed again, the screen returns to the thumbnail view while a moving image photographed after the still image photographing is being reproduced before this thumbnail view display. Here, the moving image is reproduced in the order of FIG. 6D, FIG. 6C, FIG. 6B, and FIG. 6A. After the reproduction of the moving image, the process returns to Step S34 and the thumbnail view display is performed as shown in FIG. 5A. Note that, while the related image is reproduced in the reverse direction in Step S44, the related image may be reproduced in the forward direction.

When the thumbnail view has not been selected in the determination result in Step S33, subsequently it is determined whether image switching is to be performed or not (S52). When the thumbnail view is not displayed, one frame of the still image is displayed, and, in this case, the operation state of an operation member in the operation section 9 is determined about whether an instruction has been provided for the switching to the next frame or the switching to the previous frame. When the image switching is not to be performed, the process returns to Step S33.

On the other hand, when the switching operation is to be performed in the determination result in Step S52, subsequently the next image is displayed (S53). Here, the image data of the next image is read out and displayed on the display section 8 according to the operation of an operation member. When the next image has been displayed, subsequently it is determined whether the process is to be terminated or not (S54). Here, the operation state of an operation member in the operation section 9 is determined about whether an instruction has been provided for terminating the reproduction mode. When the reproduction mode is not to be terminated in this determination result, the process returns to Step S33, and when the reproduction process is to be terminated, the process returns to the original flow.

As explained above, an embodiment of the present invention performs the photographing of the moving image automatically before the still image photographing. Then, in the reproduction, when one of plural images displayed in a thumbnail view is selected, the embodiment is configured to perform the still image display after the display of the moving image, and, when the display returns to the thumbnail view, perform the thumbnail view display after the display of a moving image. Thereby, when viewing a still image, it is possible to enjoy a moving image at the time of the still image photographing, together with the still image. Further, the present embodiment displays photographed images in the order of thumbnail images, a moving image, and an enlarged still image, and thereby it is possible to reduce the impression of an insufficient quality for the moving image by sandwiching the moving image, even if a moving image providing a feeling of incompleteness, between the still images for display.

Note that, while the present embodiment is configured to reproduce the moving image both in the transition state from the thumbnail view to the still image and in the transition state from the still image to the thumbnail view, the moving image may be reproduced in either one of the transition states. Further, while the present embodiment is configured to reproduce the moving image before the still image photographing in the transition from the thumbnail view to the still image and reproduce the moving image after the still image photographing in the transition from the still image to the thumbnail view, obviously the moving images may be reproduced in the reverse relationship.

Next, a variation example of an embodiment in the present invention will be explained by the use of FIGS. 11A to 11D and FIG. 12. While an embodiment of the present invention reproduces and displays a series of moving images photographed before or after the still image photographing, the present variation example is configured not to use the whole series of moving images but to eliminate images completely not having a movement and an image showing an unnatural movement. That is, an embodiment utilizes a time range from the display of the thumbnail still image to the display of the enlarged still image and reproduces the moving image photographed before or after the still image photographing, which moving image does not have introduction, development, turn, and conclusion. Since the reproduction is performed utilizing an vacant time range, a feeling of incompleteness or incompletion is reduced even for the moving image not having introduction, development, turn, and conclusion, but, even in such a case, an image completely without a movement or a too disturbed image provides an unnatural feeling. Accordingly, the variation example of the present invention is configured to select a screen from images as shown in FIGS. 11A to 11D.

First, an idea for the image selection in the present variation example will be explained by the use of FIGS. 11A to 11D. Images 41*a* to 41*c* of FIG. 11A, images 42*a* to 42*c* of FIG. 11B, images 43*a* to 43*c* of FIG. 11C, and images 44*a* to 44*c* of FIG. 11D are moving images, respectively, and images 41*d*, 42*d*, 43*d*, and 44*d* are still images.

Figure 11A:
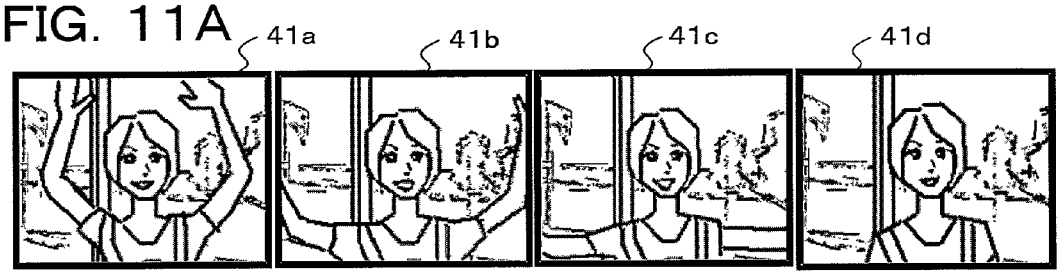
FIGS. 11A to 11D are diagrams explaining the selection of a moving image in a camera according to a variation example of an embodiment of the present invention.
Figure 11B:
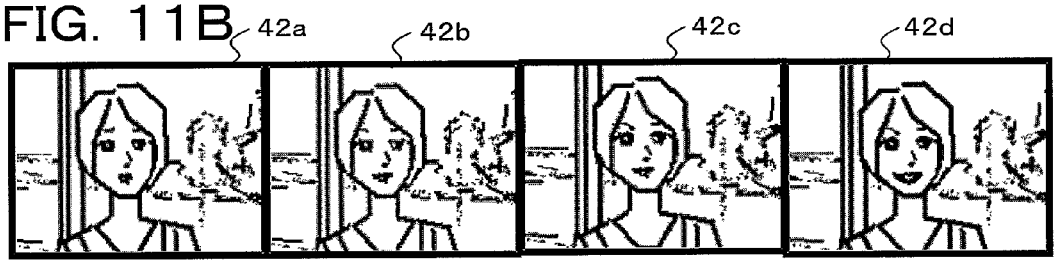
Figure 11C:
Figure 11D:

The images 41*a* to 41*c* of FIG. 11A is a moving image, and, in this moving image, the position of a face image in the screen does not change noticeably but the periphery of the face image, that is, a pose and a background, changes. Further, also in the images 42*a* to 42*c* of FIG. 11B, the position of a face image in the screen does not change noticeably the same as in the images 41*a* to 41*c* of FIG. 11A, but the images show a scene in which shape and expression in each of an eye and a lip change in the face image. Further, the images 43*a* to 43*c* of FIG. 11C show a scene in which a background does not change but a person enters the screen.

Such a scene of the images 41*a* to 41*c*, 42*a* to 42*c*, or 43*a* to 43*c* is selected from the moving image and then reproduced and displayed. On the other hand, a scene such as the images 44*a* to 44*c* of FIG. 11D is configured not to be employed as the moving image because the direction of a camera or composition is not stable. When the whole screen changes unstably, a viewer sometimes feels sick. When images as shown in the images 42a to 42c are obtained successively after the images 44a to 44c, an inappropriate portion may be eliminated and only an appropriate portion may be utilized.

Figure 12:
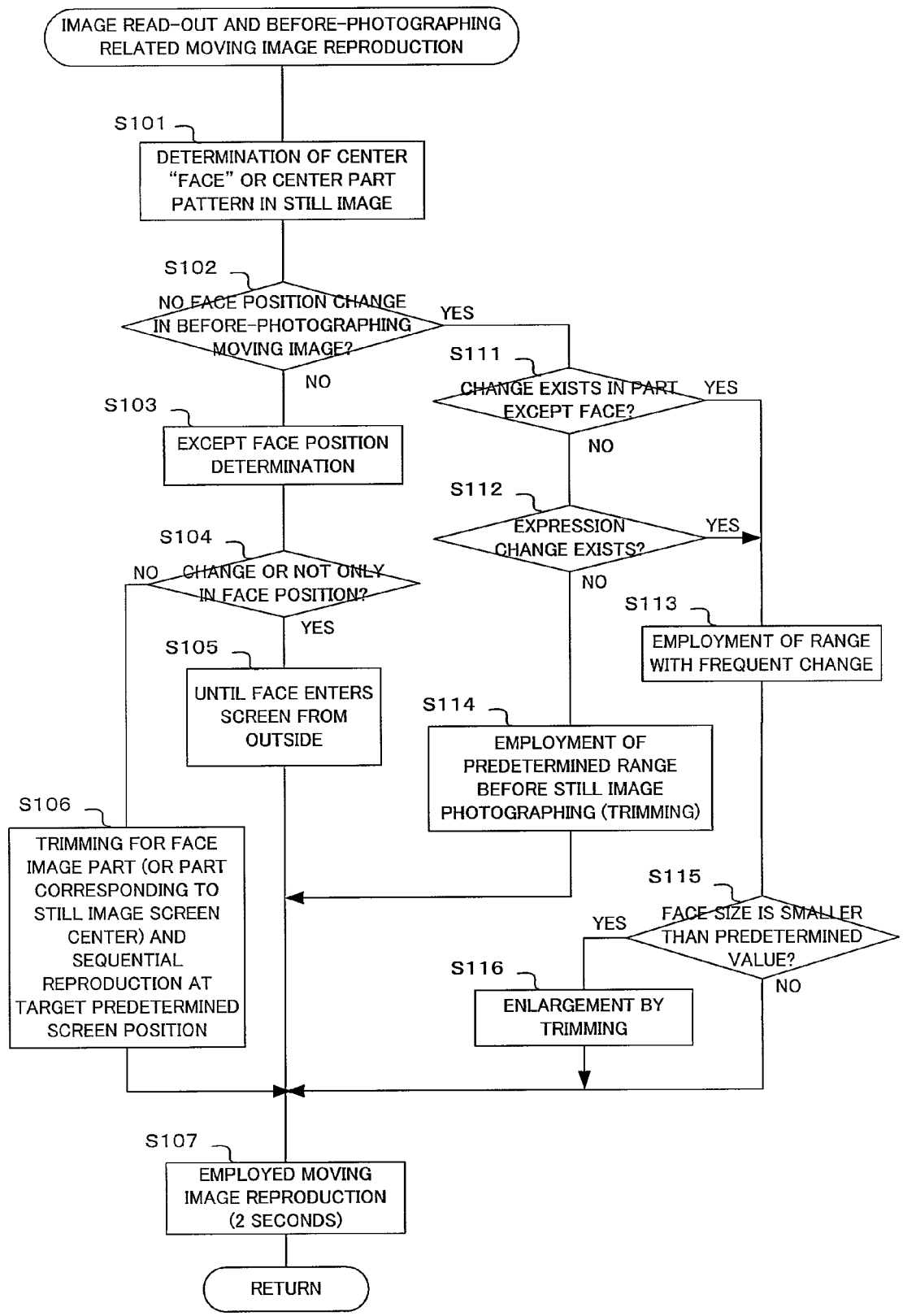
FIG. 12 is a flowchart showing the operation of image read-out and the reproduction of a before-photographing related moving image in the camera according to the variation example of the embodiment of the present invention.

By the use of a flowchart shown in FIG. 12, there will be explained processing for eliminating an inappropriate moving image portion and selecting an appropriate portion as explained by the use of FIGS. 11A to 11D. A subroutine of image read-out and before-photographing related moving image reproduction shown in this FIG. 12 is the processing of Step S41 in FIG. 10.

When the image read-out and before-photographing related moving image reproduction flow starts, first a face in the center of a still image or a pattern in a center part is determined (S101). Here, the face position of an object is determined by the use of the still image as a product, for a reference. A face does not exist depending on the image, and, in such a case, a pattern in a screen center part is determined.

Successively, it is determined whether the face position in the moving image before the photographing has a change or not according to the determination result in Step S101 (S102). When the face position does not have a change in this determination result, subsequently it is determined whether a part except the face has a change or not (S111). When the change does not exist in this determination result, subsequently it is determined whether expression change exists or not (S112).

When the change exists in the determination result in Step S111 or in the determination result in Step S112, the image in a range showing a frequent change is employed (S113). The case of having the change in the determination result in Step S111 is the same as the case of the images 41a to 41c of FIG. 11A, and the case of having the change in the determination result in Step S112 is the same as the case of the images 42a to 42c of FIG. 11B. In this case, part of the moving image showing a frequent change is used for the moving image reproduction. Note that, for determining whether the change is frequent or not, the image processing section 5 determines the motion vector or the like and utilizes this determination result.

When the range showing a frequent change has been employed in Step S113, subsequently it is determined whether the size of the face is smaller or not than a predetermined value (S115). Here, the determination is performed according to the size of the face detected by the face detection section 2a. When the face size is smaller than the predetermined value in this determination result, the face size is increased by the trimming (S116). This is performed for the purpose of showing the face expression clearly to be viewed. The determination value in Step S115 may be set so as to be able to determine whether the face size is large enough or not to show the expression clearly.

When the expression change does not exist in the determination result in Step S112, a predetermined range before the still image photographing is employed (S114). Since this is a case in which any of the face position, the expression, and the background does not have a change, and thereby the moving image for the predetermined time before the still image photographing is employed in this step. Here, the trimming processing may be performed for providing variety to the image.

When the face position has changed in the before-photographing moving image in the determination result in Step S102, subsequently determination is performed for a part except the face (S103). Here, it is determined whether the part except the face has a change or not. The determination is performed by utilizing camera shake information, posture change information, or the like. Successively, it is determined according to the determination in Step S103 whether the change exists or not only in the face position (S104). Here, it is determined whether or not this is a case such as one in which a background does not change but a person enters, as shown in the images 43a to 43c of FIG. 11c.

When only the face position has changed in the determination result in Step S104, part of the moving image is employed until the face position enters the screen from outside the screen (S105). On the other hand, when the image has also changed in a part except the face position, the face images are provided with the trimming and sequentially reproduced to fit in a predetermined position (S106). This state shows a case such as an example shown in the images 44a to 44c of FIG. 11D, and the images reproduced as they are may become uncomfortable images. Accordingly, only the face part is provided with the trimming and made to fit in a predetermined position in the screen, and thereby stable images are obtained. Note that, when the face is not included, an image corresponding to a center part of the still image is provided with the trimming.

When the processing in Steps S106, S105, S114, and S116 has been completed, or when the face size is larger than the predetermined value in the determination result in Step S115, subsequently the reproduction of the employed moving image is performed (S107). Here, the reproduction is performed for the range employed or the moving image provided with the image processing in Steps S105, S106, S114, S113, and S116 in the moving image photographed before the still image photographing.

For performing the reproduction in a predetermined time, the reproduction is carried out so as not to take a too long time in the enlargement of the still image by fast forwarding or slow reproduction. Further, priority may be changed in consideration of the time length of the moving image so as not to make a time for the moving image too long or too short. Note that, while the reproduction time is assumed here to be two seconds, for example, this time may be changed optionally in consideration of user's preference. Moreover, a suitable moving image may be selected and reproduced from the area of the after-photographing moving image according to the same idea as that about FIGS. 11A to 11D.

In this manner, the present variation example is configured to be capable of selecting and displaying a moving image suitable for the reproduction of the moving performed together at the still image reproduction, from a series of moving images obtained before or after the still image photographing. Thereby, it is possible to prevent the reproduction of an undesirable image having unstable composition.

As explained above, each of the embodiment and the variation example of the present invention is configured to reproduce and display a moving image when an instruction is provided for enlarging and displaying an image. Thereby, it is possible to enjoy the moving image together when viewing the image intentionally photographed by a photographer. That is, each of the embodiment and the variation example of the present invention utilizes a time until the image is enlarged and displayed and, in this time, reproduces and displays the moving image photographed together at the photographing time of the image designated by the enlargement instruction, and thereby it is possible to enjoy the image recalling the state of the photographing.

Such a display method in the embodiment and the variation example of the present invention not only does not disturb the viewing of a still image but also needs not perform reproduction operation of the moving image additionally. Since the movement of an object can be viewed at the same time in a still image itself and in a moving image attached to the still image, a user stress freely and naturally can enjoy a more real situation of the photographing. By performing such display, a child and the like come to behave in an interesting manner in the still image photographing and it is possible to record a more colorful memory. Even if a child does not exist, the close-up image by the automatic trimming is interesting by itself and also does not affect the still image of an original product in any way, and further a photographer and an object can be dedicated to the still image photographing.

Further, each of the embodiment and the variation example of the present invention reproduces a moving image related to a still image, and thereby it is possible to obtain an impressive image having a natural movement notwithstanding whether the timing is before or after the still image photographing. For example, a slide show can be devised to be performed by the reproduction of a still image 1 and then the reproduction of a moving image 1 related to this still image 1, and successively the reproduction of a still image 2, but, in this case, the reproduction display becomes unnatural because the moving image 1 and the still image 2 have a week relationship with each other.

In the method of displaying the moving image when performing the enlarged display of the still image from a thumbnail view as in the embodiment and the variation example of the present invention, the moving image related to the still image is reproduced, and thereby it is possible to reduce such unnaturalness. This is because the moving image before the photographing can be determined to express a previous state of the enlarged image and the moving image after the photographing can be determined to be a moving image succeeding the thumbnail image, and thereby a viewer can enjoy the images by associating the still image and the moving image with each other without an uncomfortable feeling.

Note that, while each of the embodiment and the variation example of the present invention adjusts the reproduction display time according to the read-out time of the still image, the time for the moving image reproduction is sometimes too short for viewing if the moving image reproduction time is determined to match the read-out time when the read-out of the still image is carried out in a high speed. Further, some user sometimes desires to enjoy the moving image slowly, and thereby the moving image reproduction time may be extended optionally. In addition, while the each of the embodiments of the present invention assumes 0.5 seconds to be the time for the moving image photographing (continuous photographing) performed before or after the still image, this is an illustration and the time may be longer or shorter than this illustration.

Further, while the thumbnail image is a still image in the embodiment and the variation example of the present invention, the present invention can be applied also to a case in which the thumbnail image is a moving image. In this case, a moving image may be photographed before and/or after the moving image photographing as in each of the embodiments of the present invention.

Further, each of the embodiment and the variation example of the present invention is configured to reproduce the moving image before the still image photographing when having displayed the thumbnail view and performing the enlarged display of the still image designated by a user in this thumbnail view. However, the moving image reproduction timing is not limited to this case, and the moving image photographed before or after the still image photographing may be reproduced and displayed by utilizing a time to read out the next still image in frame forwarding or frame reversing, when the frame of the still image is reproduced and displayed one by one, for example.

Further, while each of the embodiment and the variation example of the present invention performs the reproduction and display in the camera 10, the image data may be transferred to a reproduction apparatus such as a personal computer after the photographing has been performed in the camera 10 and the reproduction of the still image and the moving image may be performed in this reproduction apparatus. In this case, the editing of the moving image in the reproduction (sequential enlargement and display of the moving image) may be performed either on the camera side or on the reproduction apparatus side.

Further, while each of the embodiment and the variation example of the present invention has been explained by the use of a digital camera as equipment for photographing, the camera may be a single reflex digital camera or a compact digital camera and may be a moving image camera such as a video camera and a movie camera, and further may be a camera included in a mobile phone, a mobile information terminal (PDA: Personal Digital Assistant), a game console, or the like. Anyway, the camera may be photographing equipment capable of photographing a moving image.

The present invention is not limited to the above embodiment or variation example as it is and can be realized by modifying the constituents in a range without departing from the spirit thereof in the step of implementation. In addition, various inventions can be formed by optionally combining a plurality of constituents disclosed in the above embodiment. For example, some constituents may be omitted from all the constituents shown in the embodiment. Further, the constituents may be optionally combined across the different embodiments.

What is claimed is:

1. A camera, comprising:
an imaging section converting an object image into image data and outputting the image data;
a storage section storing still image data of a still image obtained by the imaging section, thumbnail image data of the still image, and moving image data of a moving image which has been photographed at timing at least either before or after photographing of the still image such that the still image data is not included within the moving image data;
a display section performing display of one or more thumbnail views according to the thumbnail image data stored in the storage section; and
a display control section, when one of the thumbnail views is designated in the thumbnail view display in order to perform enlarged display of the still image, automatically performing display of the still image on the display section according to the still image data corresponding to the designated thumbnail view after having performed display of the moving image according to the moving image data corresponding to the designated thumbnail view stored in the storage section.

2. The camera according to claim 1, wherein
the display control section performs reproduction and display for the display of the moving image while enlarging the moving image.

3. The camera according to claim 1, wherein
the display control section performs the display of the moving image on the display section according to the moving image data when returning to the thumbnail view display after having performed the display of the still image.

4. The camera according to claim 1, wherein the display control section eliminates an image having unstable composition from the moving image for the display of the moving image.

5. The camera according to claim 1, wherein the display control section displays the moving image in an order reverse to a photographing order for the display of the moving image.

6. The camera according to claim 1, further comprising a parameter control section performing processing which provides a parameter change in the photographing of the moving image.

7. The camera according-to claim 1, still further comprising a trimming section trimming the moving image data to cut out a face part in the photographing of the moving image after the photographing of the still image.

8. A display control method of a camera, comprising the steps of:

obtaining image data from an object image;

storing still image data obtained for a still image and moving image data of a moving image photographed at timing at least either before or after photographing of the still image such that the still image data is not included within the moving image data;

displaying a thumbnail view on a display section according to the still image data; and automatically performing display of the still image on the display section, when one of the thumbnail views is designated on a display screen of the thumbnail view in order to perform enlarged display of the still image, according to the still image data corresponding to the designated thumbnail view after having performed display of the moving image according to the moving image data corresponding to the designated thumbnail view.

9. A display control method of a camera, the method comprising:

obtaining image data from an object image;

storing both (1) still image data obtained for a still image and (2) moving image data of a moving image captured either (A) during a predetermined time period just before photographing of the still image, or (B) during a predetermined time period just after photographing of the still image;

displaying a thumbnail image on a camera display according to the still image data;

receiving a user selection of the displayed thumbnail image; and automatically displaying, responsive to the received user selection of the displayed thumbnail image, (1) the moving image according to the moving image data, wherein a size of the displayed moving image increases with time, and (2) the still image according to the still image data, after completion of the display of the moving image.

10. The display control method of claim 9 wherein the act of storing stores moving image data of a moving image captured during a predetermined time period just before photographing of the still image.

11. The display control method of claim 9 wherein the act of storing stores moving image data of a moving image captured during a predetermined time period just after photographing of the still image, and wherein the act of automatically displaying the moving image according to the moving image data displays the moving image in a reverse order of the moving image data.

* * * * *